United States Patent [19]
Armstrong

[11] 3,734,281
[45] May 22, 1973

[54] PIPE PALLET

[76] Inventor: James E. Armstrong, 19811 White Dove Trail, Crosby, Tex.

[22] Filed: Dec. 15, 1971

[21] Appl. No.: 208,280

[52] U.S. Cl..................206/65 B, 214/10.5, 248/346
[51] Int. Cl.......................B65d 71/04, B65g 1/14
[58] Field of Search..........................206/65 B, 65 R; 214/10.5 R

[56] References Cited

UNITED STATES PATENTS

| | | | |
|---|---|---|---|
| 2,611,495 | 9/1952 | Weaver | 214/10.5 |
| 3,288,311 | 11/1966 | Beattie | 206/65 B X |

FOREIGN PATENTS OR APPLICATIONS

| | | | |
|---|---|---|---|
| 314,942 | 9/1969 | Sweden | 206/65 B |

*Primary Examiner*—Leonard Summer
*Attorney*—Ned L. Conley et al.

[57] ABSTRACT

A rack of pipe composed of a plurality of pipe rack elements on which pipes are laid, with another plurality of pipe rack elements on top of the first layer of pipe and a second layer of pipe on top of these. The pipe rack elements have stops on the ends which in one position, prevent the pipes from rolling off of the rack elements, and in another position allow the pipes to roll off.

3 Claims, 5 Drawing Figures

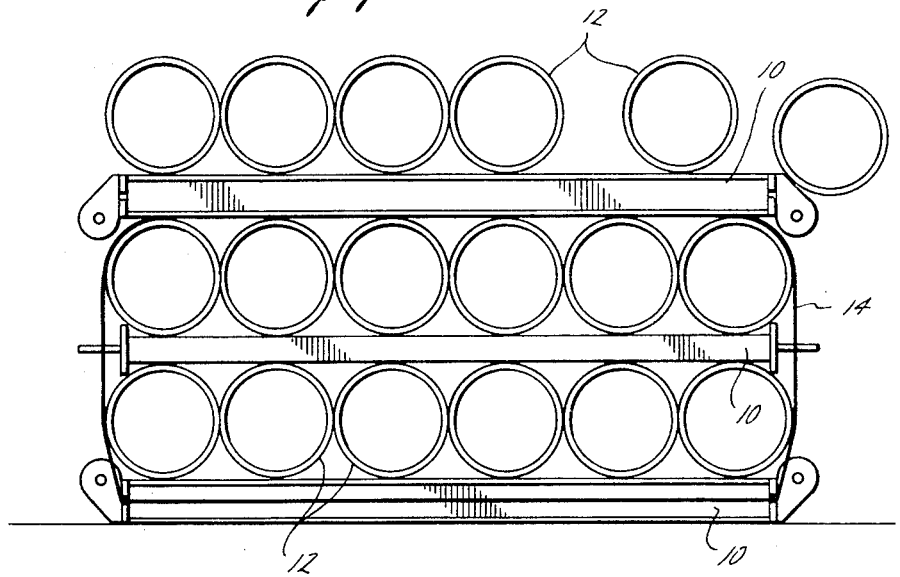
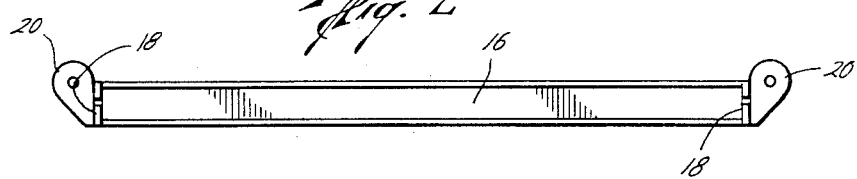
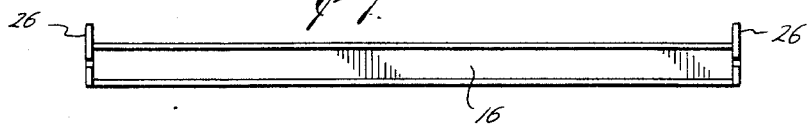
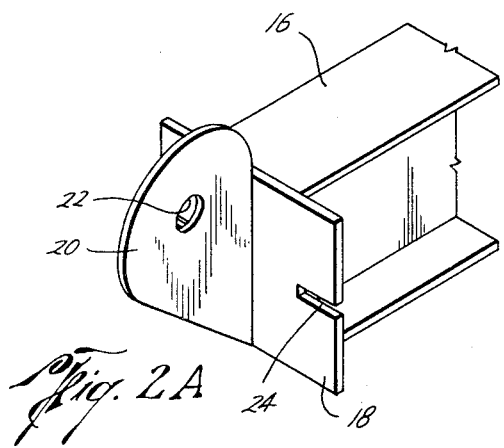
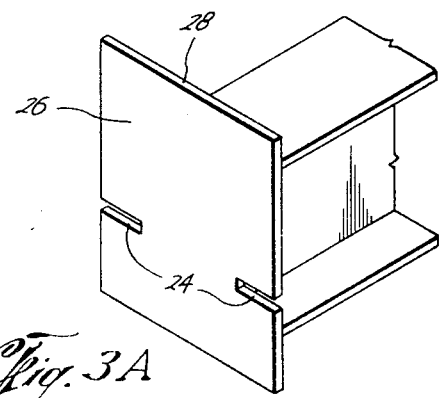

PIPE PALLET

BACKGROUND OF THE INVENTION

1. Field of the Invention

This invention is an apparatus to improve the handling of pipe in storage and shipping.

2. Description of the Prior Act

In the past it has been the practice to ship large numbers of pieces of pipe either loose, i.e. separate from each other, or in bundles with straps around the pipes. Handling individual pipes is time consuming, and special racks must be built in storage yards and on shipping vehicles to prevent moving and shifting of the individual pipes. Strapping is some improvement, but this has been difficult when large size pipes are handled and adds little to the convenience of handling. Furthermore, with such strapping it is still necessary to get a chain around the bundle of pipe in order to lift it with a crane or the like.

In order to overcome some of these problems it has been the practice to lay a number of pieces of pipe on a plurality of wooden or metallic strips, and then put straps around the strips and the pipe to provide some degree of rigidity. However, even in such arrangements there is still the problem of shifting of the pipe which causes breaking of the straps, so that it is still necessary to utilize pipe racks during shipment and storage to insure that the pipes do not get loose.

SUMMARY OF THE INVENTION

According to the present invention a pipe rack element is provided which comprises an elongate beam having stops on each end, the stops extending beyond the side of the beam on at least one side of the beam at both ends, and not extending beyond the side of the beam an another side of the beam at at least one end, so that the element can be used beneath a first layer of pipes, to support them and hold them from rolling, or between a first layer and a second layer of pipes, to support the second layer and prevent the pipes from shifting with respect to each other, and can be rotated to allow the pipes to roll off of the elements. The invention is also in a rack of pipes utilizing such elements.

BRIEF DESCRIPTION OF THE DRAWING

The drawing, which shows certain perferred embodiments, but not all embodiments, of the invention, is as follows:

FIG. 1 is an end elevational view of one embodiment of the rack of pipe of this invention, showing a second rack superimposed on the first rack with the second rack being unloaded;

FIG. 2 is an elevational view of one embodiment of a pipe rack element according to this invention;

FIG. 2A is an enlarged fragmentary isometric view of one end of the embodiment shown in FIG. 2;

FIG. 3 is an elevational view of another embodiment of the pipe rack element of this invention; and FIG. 3A is an enlarged fragmentary isometric view of an end of the embodiment shown in FIG. 3.

DESCRIPTION OF THE PREFERRED EMBODIMENTS

As shown in FIG. 1 of the drawing the pipe rack assembly of this invention comprises a plurality of pipe rack elements 10, supporting a plurality of pipes 12. In the embodiment shown the pipe rack assembly consists of two layers of the pipes 12 and these layers are secured together by means of straps 14, which may be the usual metal bands or straps used in packaging.

According to one embodiment of the invention, and as shown in FIGS. 2 and 2A, each pipe rack element consists of an elongate beam 16 having affixed to each end a stop member comprising a flat plate 18 which may, for example, be welded to the end of the beam and lie perpendicular to the axis of the beam. The beam shown is made of a small I-beam, as, for example, 2 inches by 3 inches, although it will be apparent that other structural forms can be used for this purpose. The plate 18 may be ordinary mild steel plate, for example, ⅛ inch to ¼ inch thick. As shown in the drawing, the plate 18 does not extend above or below the beam but does extend out on each side of the beam, when the beam is lying in the position of the bottom pipe rack element shown in FIG. 1. In this embodiment of the invention the stop also includes an ear 20 which is, for example, welded to the plate 18, the plane of the ear being parallel to the axis of the beam and preferably substantially centered on the beam. This ear sticks up above the upper surface of the beam and preferably is provided with an eye 22 which may be used for lifting purposes.

The side extensions of the plate 18 are preferably provided with horizontally extending slots 24 for a purpose which will hereinafter be described.

The embodiment shown in FIG. 3 also includes the beam 16, to which are welded stop plates 26. The stop plates 26 extend to both sides of the beam and also extend above the beam, but do not extend below the beam. These stop plates are also provided with slots 24.

In use a plurality of the pipe rack elements 10 are laid out on the ground or floor, substantially parallel to each other and spaced apart along a distance just short of the length of the pipe to be supported thereon. The orientation of the pipe rack elements is as shown for the bottom elements in FIG. 1, i.e. with the ear 20 extending upwardly, assuming this is the embodiment being used, or with the upper portion 28 extending upwardly, if the embodiment of FIGS. 3 and 3A is being used. The bottom of the beam may then lie flat on the floor or other surface, whereas the ear 20 or the top portion 28 extends upwardly and acts as a chock to prevent the pipe from rolling off of the elements. To prevent shifting of the pipe, the distance between the stops is preferably calculated so the particular size of pipes supported thereon will bear against the stops on both ends of the element.

Once the first layer of pipe has been loaded on the rack elements, another plurality of pipe rack elements is laid on top of these, and these are turned sideways, so that the stops on the ends of these elements extend both upwardly and downwardly from the beam. Another layer of pipe is laid on the second plurality of pipe rack elements. The stops on this second row of pipe rack elements therefore secure the upper and lower layers of pipe to each other and prevent lateral shifting of these layers with respect to each other. If desired, additional layers of pipe can be added in the same manner. When all of the layers desired are added, the entire rack of pipe is secured together, preferably by the usual metal straps well known in the art. These are passed through the slots 24 in the bottom layer of pipe rack elements to secure these elements to the rack of pipe.

Preferably such packaging of the pipe is accomplished at the pipe mill and it need not be unpackaged until it reaches the point of use. The rack of pipe is easily lifted by means of a forklift, which can get under the pipe, or by means of a crane, using shackles if the type shown in FIG. 2 is used, which has the eyes 22 for attachment of the shackles, or using a chain sling around the rack. The bundles of pipe are easily stacked in railroad cars or on trucks and are easily handled on boats or platforms without the need for auxiliary pipe racks, either during transportation or storage. As shown in FIG. 1, the bundles may be stacked on top of each other.

When it is desired to remove the individual pipes from such a bundle the straps are first cut in the usual manner. This does not result in the bundle falling apart, as is the usual case, because the stops prevent the individual pipes from rolling. The next step is to rotate the top layer of pipe rack elements 90° about their longitudinal axes so that the flat side of the element is on top. This may be done by applying a pipe wrench to the ear 20, for example. This moves the stop which was holding the pipe in place, so that the pipes lying on this row of pipe rack elements may be rolled off as desired. Once this layer of pipe has been removed, the uppermost row of pipe rack elements may be removed and the next row rotated to release the pipe resting on that row. It will be appreciated that the bottom row of pipe rack elements must be rotated 180° to turn them to the position necessary for rotating the pipe.

Preferably all of the pipe rack elements are made identical and symmetrical on both ends for ready interchangeability. However, it will be appreciated that those used in the bottom row require a stop only on the top of the beam, and those used between two rows of pipes require only stops on opposite sides of the beam. In addition, the elements could have stops on all four sides at one end, since the pipes could be rolled off the other end. Furthermore, slots 24 to receive the straps need be used only on those elements which are on the outside of the bundle. Thus these could be omitted in elements which are between layers of pipe.

Many other modifications will become apparent to those who are skilled in the art and therefore the invention is not limited to the specific embodiments shown and described, but also includes all variations within the scope of the appended claims.

I claim:

1. A rack of pipe comprising a first plurality of elongate, horizontally disposed pipe rack elements being substantially parallel to each other, each pipe rack element comprising an elongate beam having a stop member on each end, each stop member extending above said beam but not below it, a plurality of pipes lying on and perpendicular to said pipe rack elements, said pipe rack elements being spaced apart along the length of the pipes, a second plurality of pipe rack elements lying on, perpendicular to, and spaced along the length of the pipes, each pipe rack element of said second plurality comprising of an elongate beam having a stop member on each end extending above, below and to one side of said beam but not extending to the opposite side, a second plurality of pipes lying on and perpendicular to said second plurality of pipe rack elements, and means securing said pipes and said pipe rack elements in a bundle.

2. A rack of pipe as defined by claim 1 wherein said securing means comprises a plurality of straps tightly wrapped around said pipes, each of said first plurality of pipe rack elements being engaged and secured by a strap.

3. A rack of pipe as defined by claim 1 wherein each of said first plurality of pipe rack elements is provided with a lifting lug.

* * * * *